United States Patent
Massanetz et al.

(10) Patent No.: US 9,291,233 B2
(45) Date of Patent: Mar. 22, 2016

(54) DEVICE FOR DAMPING VIBRATIONS

(75) Inventors: Klaus Massanetz, Wartenberg (DE);
Wolfram Engelhardt, Dachau (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 208 days.

(21) Appl. No.: 14/009,394

(22) PCT Filed: Mar. 28, 2012

(86) PCT No.: PCT/EP2012/001360
§ 371 (c)(1),
(2), (4) Date: Oct. 30, 2013

(87) PCT Pub. No.: WO2012/143084
PCT Pub. Date: Oct. 26, 2012

(65) Prior Publication Data
US 2014/0299427 A1    Oct. 9, 2014

(30) Foreign Application Priority Data

Apr. 18, 2011    (DE) .......................... 10 2011 017 350

(51) Int. Cl.
| | |
|---|---|
| *F16F 15/02* | (2006.01) |
| *B60R 21/203* | (2006.01) |
| *B62D 7/22* | (2006.01) |
| *F16F 7/104* | (2006.01) |

(52) U.S. Cl.
CPC .............. *F16F 15/02* (2013.01); *B60R 21/2037* (2013.01); *B62D 7/222* (2013.01); *F16F 7/104* (2013.01)

(58) Field of Classification Search
CPC ........... B62D 7/22; B62D 7/222; F16F 15/02; F16F 7/104; B60R 21/05; B60R 21/20; B60R 21/26; B60R 21/2037; B60R 20/217; B29C 35/0866
USPC ................ 188/380; 280/728.2, 734, 731, 741
See application file for complete search history.

(56) References Cited

U.S. PATENT DOCUMENTS

| | | | | |
|---|---|---|---|---|
| 6,095,549 | A  * | 8/2000 | Adomeit et al. | ........... 280/728.2 |
| 6,398,255 | B1 * | 6/2002 | Scherzinger et al. | ......... 280/731 |
| 6,435,540 | B1 * | 8/2002 | Durre | ......................... 280/728.2 |
| 7,144,034 | B2 * | 12/2006 | Nash et al. | ................. 280/728.2 |
| 8,616,577 | B1 * | 12/2013 | Matsu et al. | ............... 280/728.2 |

(Continued)

FOREIGN PATENT DOCUMENTS

| | | |
|---|---|---|
| DE | 198 40 998 A1 | 3/2000 |
| DE | 199 08 915 A1 | 9/2000 |

(Continued)

OTHER PUBLICATIONS

German Examination Report—Jul. 24, 2012.
PCT International Search Report—Jun. 25, 2012.

*Primary Examiner* — Melanie Torres Williams
(74) *Attorney, Agent, or Firm* — Brinks Gilson & Lione

(57) ABSTRACT

An apparatus for the damping of vibrations in a steering column in a motor vehicle, having a mounting (10) and an accommodation device (11) elastically supported in the mounting (10) to which a gas generator (20) is secured, a separate supplemental weight (30) is secured to the gas generator (20) or to the accommodation device (11) to provide desired vibration damping characteristics of the steering column assembly.

13 Claims, 3 Drawing Sheets

(56) References Cited

U.S. PATENT DOCUMENTS

| | | | |
|---|---|---|---|
| 2002/0117836 A1* | 8/2002 | Asic et al. | 280/728.2 |
| 2002/0140212 A1* | 10/2002 | Hauer | 280/731 |
| 2004/0239080 A1* | 12/2004 | Berrahou et al. | 280/728.2 |
| 2009/0218739 A1* | 9/2009 | Terada | B60R 21/2037 267/2 |

FOREIGN PATENT DOCUMENTS

| | | |
|---|---|---|
| DE | 199 13 120 A1 | 9/2000 |
| DE | 10 2004 038 023 A1 | 2/2006 |
| DE | 20 2006 016 948 U1 | 3/2007 |
| DE | 10 2005 055 934 A1 | 5/2007 |
| DE | 10 2009 004 802 A1 | 7/2010 |

* cited by examiner

DEVICE FOR DAMPING VIBRATIONS

CROSS-REFERENCE TO RELATED APPLICATION

This application claims priority to German Patent Application No. 10 2011 017 350.1, filed Apr. 18, 2011 and PCT/EP2012/001360, filed Mar. 28, 2012.

FIELD OF THE INVENTION

The invention relates to an apparatus for the damping of vibrations, in particular in a steering column of a motor vehicle, with a mounting and an accommodation device elastically supported in the mounting to which a gas generator is secured.

BACKGROUND

From DE 199 08 915 B4 a vibration eliminator for a steering wheel with an airbag is known, in which the inertial mass of the vibration eliminator is formed by the gas generator of the airbag. The gas generator is connected via a spring element to the airbag housing; said spring element engages the outer wall of the gas generator and consists of reinforced, gas-impermeable, elastomeric material. The spring element has the shape of a blunt cone which essentially features a constant wall thickness.

In a motor vehicle, the steering column and the steering wheel with the driver airbag form a vibrating system. In order to eliminate, or at least to reduce, harmful or unpleasant vibrations in a vibrating system, the coordination and arrangement of a mass with a particular weight is helpful. By a change in the inertial mass, the vibration behavior can be changed so that the elimination of vibrations will ideally result.

In the prior art, the inertial mass is provided by the gas generator; the gas generator is connected via a connecting plate to the spring element. The object of the present invention is to create an apparatus for the damping of vibration by means of which an adaptation to different frequencies of a steering column or to a different, vibration system is possible in order to suppress undesirable vibrations.

According to the invention, this object is attained by an apparatus with the features described herein. Advantageous embodiments and refinements of the invention are presented, in the description and in the figures.

SUMMARY

In accordance with this invention, the apparatus for the damping of vibrations, in particular in a steering column in a motor vehicle with a mounting and an accommodation device elastically supported in the mounting, to which a gas generator is secured, provides for a separate supplemental weight which can be secured to the gas generator and/or to the accommodation device. In order to attach a gas generator to the steering column or to the steering wheel, a mounting is provided in which an accommodation device is elastically mounted for the airbag and/or for the gas generator. Thus, the gas generator acts as a vibration damper for the driver unit comprised of the steering column, steering wheel and airbag. Depending on the configuration of the driver unit and on the eigen-frequency (resonant frequency) of the steering column or vibration system, different masses can be required as vibration dampers, which cannot be achieved by one single gas generator. More recent generations of gas generators can be so light-weight, for example, that they do not reach the required inertial mass for purposes of vibration damping. As a result of the supplemental weight, a balanced inertial mass can be provided which is adapted to the vibration properties of the steering column, of the steering wheel and of the airbag attached thereon. In particular, with very light-weight gas generators and light-weight materials it is possible to increase and adapt the inertial mass by means of the supplemental weight and to secure it to the accommodation device and/or to the gas generator so that the supplemental weight is elastically secured to the mounting via the gas generator and the accommodation device.

Attachment elements to secure the supplemental weight can be arranged on or configured on the accommodation device and/or on the gas generator. These attachment elements can be configured as plastically deformable tabs, elastic snap elements, positive locking elements in general, as hooks, clips or the like in order to allow an attachment of the supplemental weight to the gas generator, to the accommodation device or to both components. For this purpose, corresponding positive-locking elements are advantageously arranged or configured on the supplemental weight for the attachment elements provided on the accommodation device, so that the supplemental weight can be optionally mounted before or after the attachment of the gas generator to the accommodation device.

The supplemental weight can be reversibly secured to the gas generator and/or to the accommodation device, so that it can be replaced for maintenance or repair, for example, within the scope of any adaptation or modification. It is also possible first to supply a basic variant of the device consisting of mounting, gas generator and supplemental weight, and only adapt it to the particular requirements of the vehicle at the mounting place. In this regard it may be useful to be able to remove the supplemental weight from the gas generator or from the accommodation device.

The supplemental weight can be glued, crimped, compressed, screwed, clipped and/or riveted to the gas generator and/or to the accommodation device, so that it can also be irreversibly (permanently) attached to the particular components.

The gas generator in a driver airbag is typically configured as a cylindrical or approximately cylindrical element, so that the supplemental weight is configured ring-shaped or dish-shaped for a space-saving assembly and a tightest possible fit to the gas generator, so that the mass is uniformly distributed around the gas generator. Likewise, due to the ring-shaped or dish-shaped configuration of the supplemental weight with a corresponding contouring relative to the gas generator, an arrangement with a minimum installation volume is possible.

At least one opening can be provided in the supplemental weight for the passage of lines, wires, and/or attachment elements. The opening can likewise be used for the passage of contacts of the gas generator through the bottom of the supplemental weight. Other components, such as plugs, can also protrude through the at least one opening.

One embodiment of the invention provides that the supplemental weight features a recess along its perimeter which acts as a circumferential positive-locking element for locking to the gas generator or to the accommodation device. The supplemental weight can have a circumferential ring located in a plane, which is preferentially configured closed and acts as an anchoring element for the attachment elements. The ring is preferentially arranged on the outside of the supplemental weight and can form the recess which extends radially outward as an undercut or positive-locking element for the attachment elements.

The mounting can be configured as a vibration eliminator for an airbag, so that the apparatus together with the airbag can be configured as an airbag module, in which the gas generator and possibly the supplemental weight are elastically supported. Due to the mass of the mounting, together with the mass of the gas generator, of the airbag and potentially of the supplemental weight, the vibrations of the steering wheel can be effectively eliminated.

Predefined break lines can be configured in the supplemental weight which surround regions with defined weights, so that, proceeding from a base supplemental weight, by removal of defined weights, the desired supplemental weight can be adjusted. For this purpose, the material within the predefined break lines is removed which corresponds to the removed weight.

The invention also relates to a fully assembled module as an apparatus for the damping of vibrations consisting of a mounting with an elastically supported accommodation device to which the gas generator and the separate supplemental weight are attached, the attachment also being possible by fixing the supplemental weight to the gas generator.

BRIEF DESCRIPTION OF THE DRAWINGS

Exemplary embodiments will be explained hereafter in greater detail with reference to the included figures.

DETAILED DESCRIPTION

Figure 1:
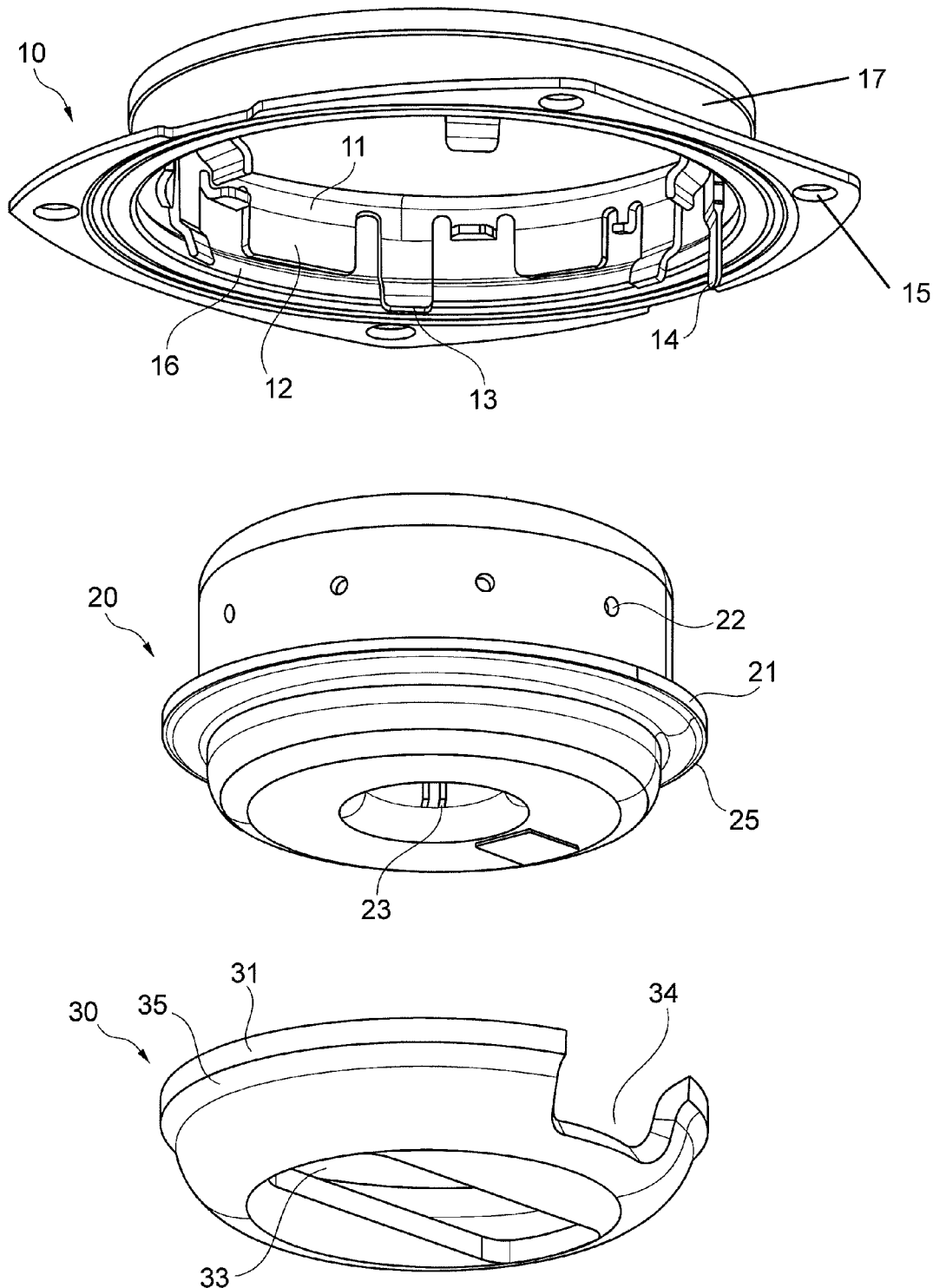
FIG. 1 is an exploded view of the apparatus.

FIG. 1 shows an exploded view of an apparatus for vibration damping on a steering column of a motor vehicle, with a mounting 10 which is configured as a retaining ring, with a flange which has recesses 15 for attachment to the steering column or steering wheel, for example. The recesses (or holes) 15 are used to allow for the insertion of screws or other attachment elements, for example. A collar 17 extends from the flange essentially perpendicularly upward on whose inside there is an accommodation device 11. The collar 17 as such can be configured as an elastic element; it is likewise possible to configure the collar 17 as a shaped metal element to which an elastic component is attached for securing the accommodation device 11. Such an elastic element is preferentially arranged on the inside of the collar 17; it is preferred that the accommodation device 11 be in general elastically supported relative to the flange of the mounting 10 which is attached to the steering column or to the steering wheel.

Tabs 18 are arranged on the accommodation device 11, which protrude radially inward. In the shown embodiment, the accommodation device 11 has a circular shape, but different geometries are possible.

Attachment elements 12, 13 configured as tabs or tongues are provided on the accommodation device 11 and extend parallel to the collar 17; the function of said tabs will be explained below. Likewise, a plug insert 14 is provided, for example for grounding of the accommodation device 11, which is essentially configured as a single-piece sheet metal part. A multi-part configuration of the accommodation device 11 is likewise possible, as is an accommodation device 11 with an open cross section. In the shown embodiment, the accommodation device 11 is elastically joined to the flange of the mounting 10 via an elastomeric element 16. The elastomeric element 16 is attached to the outside of the accommodation device 11, for example by adhesion or vulcanizing. A similar attachment is also possible on the mounting 10.

Beneath the mounting 10 there is a gas generator 20 shown in an essentially cylindrical configuration. Outlet openings 22 are configured in the jacket of the cylindrical section of the gas generator 20 to guide deployment gas to the outside into an airbag (not shown). Beneath the outlet openings 22 there is a circumferential protrusion 21, on whose underside there is a recess 25. On the underside of the gas generator 20 there are electrical connections 23 for contacting with an electric signal and control circuit. In the assembled state, the circumferential protrusion 21 rests against the tabs 18 of the accommodation device 11 and thereby defines the installation position of the gas generator 20 relative to the accommodation device 11 and thus to the mounting 10. In the assembled state, the attachment elements 12, 13 have the shape of tabs bent inward or as inward directed springs in order to firmly secure the gas generator 20 in the accommodation device. The attachment elements 12 are thereby configured so that they resiliently rest against the outer perimeter of the protrusion 21; the longer attachment elements 13 are configured such that they are inclined radially inward, so that they engage behind the recess 25 and cause a positive-locking, permanent locking of the gas generator 20 in the accommodation device 11.

Underneath the gas generator 20 there is a supplemental weight 30 shown in a dish-like configuration. On the underside there is an opening 33 to allow for an access to the electrical contacts 23 of the gas generator 20. Through the opening 33 it is also possible to adjust the weight of the supplemental weight 30, the greater the size of the opening 33, the smaller is the weight of the supplemental weight 30 with otherwise constant dimensions.

A second opening 34 is configured in a lateral region at the upper edge of the supplemental weight 30. Due to this second opening 34 an individual adaptation to the desired, supplemental weight is possible; likewise, the second opening 34 is used to pass a connection contact 14 at the accommodation device 11.

The dish-like configuration of the supplemental weight 30 has a rim 35 on the upper, circumferential edge 31 extending up to the interruption resulting from the opening 34. The rim 35 forms a positive-locking element, so that one or a plurality of attachment elements 13 can engage behind the rim 35, so that a positive locking engagement takes place. The attachment elements 12, 13 can be configured inward in a resilient radial manner, so that due to the resilient restoring force in connection with the radially inward bent tab of the elongated attachment element 13, a secure locking of the supplemental weight 30 both to the gas generator 20 and to the accommodation device 11 will take place. The inside of the supplemental weight 30 can advantageously be configured such that the underside of the gas generator 20 can be accommodated therein, preferentially of a perfectly fitting shape of the underside of the dish-like supplemental weight 30 matching the outside contour of the underside of the gas generator 20, so that a compact design is obtained. The supplemental weight 30 will then rest with the entire surface against the underside of the gas generator 20.

Figure 2:
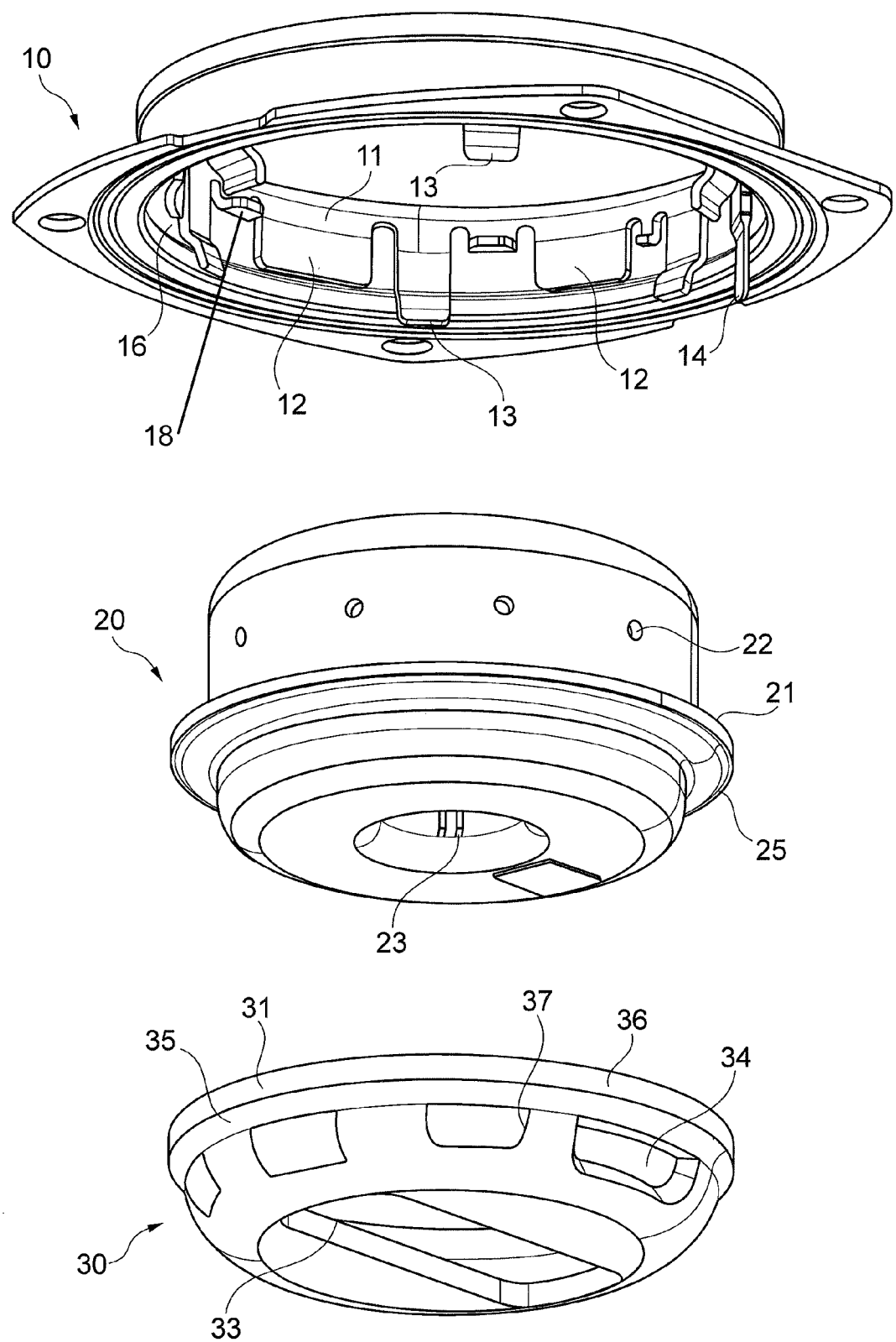
FIG. 2 shows a variant of FIG. 1.

A variant of the invention is shown in FIG. 2 in which the mounting 10 and the gas generator 20 correspond to the embodiment according to FIG. 1. A different configuration of the supplemental weight 30 is provided, in which the edge 31 is configured as a circumferential ring 36 located in a plane which is circumferentially uninterrupted, the ring also extending along the top side of the opening 34, so that the opening 34 is configured as a window surrounded on all sides by the material of the supplemental weight 30. Several such openings 34 in the form of a window can be distributed around the perimeter along the supplemental weight 30. Likewise, in FIG. 2 predefined break lines 37 are configured inside the supplemental weight 30 so that material can be more easily removed from the supplemental weight 30. Preferentially the predefined break lines 37 advantageously define a material region which has a fixed weight, so that, starting from an initial total weight, an adaptation to the desired total weight is possible more easily by removing the respective region. For example, the regions inside the predefined break line 37 have a weight of 10 g or 20 g, so that a stepped reduction of the weight is possible by removing the proportionate amount of material.

Figure 3:
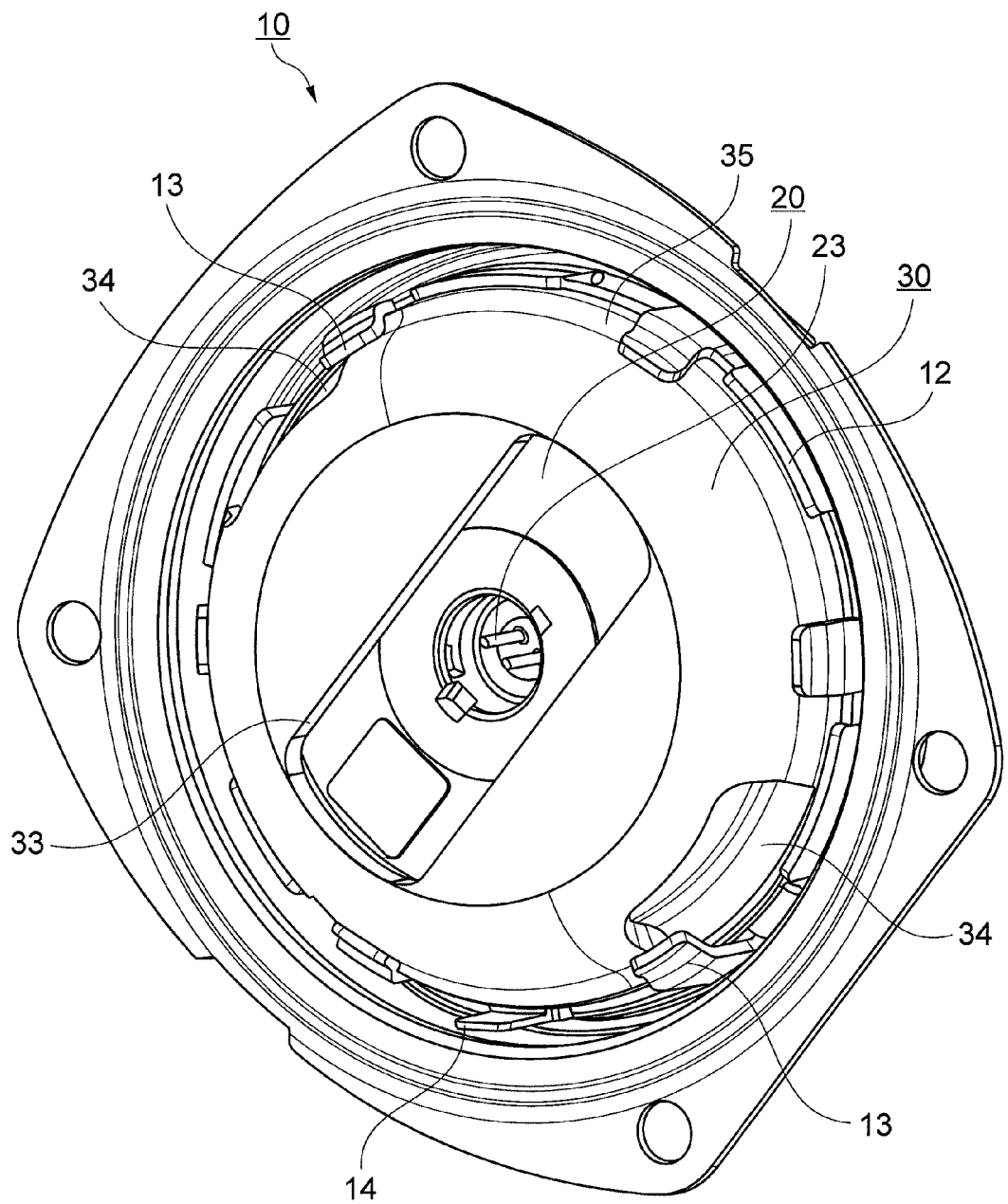
FIG. 3 illustrates a fully assembled apparatus consisting of mounting, gas generator and supplemental weight.

FIG. 3 shows the assembled state of the apparatus for the damping of vibrations on a steering column or on a steering wheel. The mounting 10 with the four attachment openings 15 and the accommodation device 11 mounted on the elastomer element 16 is shown as seen from the underside. The gas generator 20 is inserted into the cavity of the ring-shaped accommodation device 11. The attachment elements 12 rest against the outer perimeter of the gas generator 20. The supplemental weight 30 rests upon the gas generator 20; this weight is defined by the tab-like attachment elements 13 which engage behind the outer edge 31 at the rim 35. The attachment elements 13 can be configured either plastically deformable or elastically resilient in a radial inward direction. The opening 33 in the bottom region of the supplemental weight 30 allows for an access to the electrical contacts 23 of the gas generator 20. There are two openings 34 positioned symmetrically opposite each other which are used for adapting the weight of the supplemental weight 30. In the shown embodiment, the plug contact 14 is located outside of the supplemental weight 30, that is, at the outer edge outside of the perimeter of the supplemental weight 30.

While the above description constitutes the preferred embodiment of the present invention, it will be appreciated that the invention is susceptible to modification, variation and change without departing from the proper scope and fair meaning of the accompanying claims.

The invention claimed is:

1. An apparatus for the damping of vibrations in a steering column in a motor vehicle, comprising:
    a mounting and an accommodation device elastically supported in the mounting to which a gas generator for an inflatable restraint system is secured, and
    a separate supplemental weight secured to the gas generator or to the accommodation device,
    wherein the gas generator is sandwiched between the mounting and the separate supplemental weight, the separate supplemental weight acting to tune the vibration characteristics of the steering column,
    wherein the as generator includes a circumferential protrusion, and the separate supplemental weight mates with the circumferential portion of the as generator.

2. The apparatus according to claim 1, wherein attachment elements are arranged or configured on the accommodation device or on the gas generator to secure the gas generator and the supplemental weight.

3. An apparatus according to claim 1 wherein the supplemental weight is detachably secured to the gas generator or to the accommodation device.

4. An apparatus according to claim 1 wherein the supplemental weight is glued, crimped, compressed, screwed, clipped or riveted to the gas generator or to the accommodation device.

5. An apparatus according to claim 1 wherein the supplemental weight is ring-shaped or bowl-shaped.

6. An apparatus according to claim 5 wherein at least one opening is provided in the supplemental weight for the passage of electrical lines or attachment elements.

7. An apparatus according to claim 5 wherein the supplemental weight features a rim along its perimeter.

8. An apparatus according to claim 5 wherein the supplemental weight features a circumferentially continuous perimeter ring located in a plane.

9. An apparatus according to claim 1 wherein the mounting is configured as a vibration eliminator for the steering column.

10. An apparatus according to claim 1 wherein predefined break lines are configured in the supplemental weight which surround regions with defined weights.

11. An apparatus according to claim 5 wherein predefined break lines are configured in the supplemental weight which surround regions with defined weights.

12. An apparatus according to claim 5 wherein the supplemental weight defines a surface which closely conforms to a surface of the gas generator.

13. An apparatus for the damping of vibrations in a steering column in a motor vehicle, comprising a mounting and an accommodation device elastically supported in the mounting to which a as generator for an inflatable restraint system is secured, and a separate supplemental weight secured to the as generator or to the accommodation device, wherein the gas generator is sandwiched between the mounting and the supplemental weight, the supplemental weight acting to tune the vibration characteristics of the steering column;
    wherein the supplemental weight is ring-shaped or bowl-shaped;
    wherein at least one opening is provided in the supplemental weight for the passage of electrical lines or attachment elements;
    wherein at least a first of the at least one opening is near the center of the weight, and at least a second of the at least one opening is formed on or adjacent to the rim.

* * * * *